United States Patent
Lu et al.

(10) Patent No.: US 10,719,162 B2
(45) Date of Patent: *Jul. 21, 2020

(54) FORCE SENSING BEZEL TOUCH INTERFACE

(71) Applicant: INTERLINK ELECTRONICS, INC., Westlake Village, CA (US)

(72) Inventors: Chee Wai Lu, Singapore (SG); Hock Cheng Ng, Singapore (SG); Cheng Seong Lee, Singapore (SG); Wai Jye Chan, Singapore (SG)

(73) Assignee: INTERLINK ELECTRONICS, INC., Camarillo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/444,899

(22) Filed: Jun. 18, 2019

(65) Prior Publication Data
US 2019/0302950 A1     Oct. 3, 2019

Related U.S. Application Data (63) Continuation of application No. 15/744,763, filed as application No. PCT/US2016/042667 on Jul. 15, 2016, now Pat. No. 10,324,557.

(30) Foreign Application Priority Data

Jul. 15, 2015 (SG) .............................. 10201505555S (51) Int. Cl.
*G06F 3/041* (2006.01)
*G06F 3/0488* (2013.01)
*G06F 3/01* (2006.01)

(52) U.S. Cl.
CPC ............ *G06F 3/0414* (2013.01); *G06F 3/016* (2013.01); *G06F 3/0488* (2013.01); *G06F 3/04142* (2019.05); *G06F 2203/04105* (2013.01)

(58) Field of Classification Search
CPC .... G06F 3/0414; G06F 3/016; G06F 3/03543; G06F 3/04142; G06F 2203/04105; G06F 2203/04106; G06F 3/0488; G02F 1/13338
See application file for complete search history.

(56) References Cited

U.S. PATENT DOCUMENTS

2012/0088553 A1* 4/2012 Nunes ................... G06F 1/1626
                                                                    455/566
2014/0253305 A1* 9/2014 Rosenberg .............. G06F 3/016
                                                                    340/407.2

* cited by examiner

*Primary Examiner* — Xuemei Zheng
(74) *Attorney, Agent, or Firm* — Maschoff Brennan (57) ABSTRACT

A handheld device includes an electronic display having an active area for presenting visual content and a bezel disposed around the electronic display. The bezel may have an opening allowing a person to view the active area. The handheld device also includes a force sensing system having a force sensing element that is disposed below an external surface of the bezel. The force sensing system may be configured to a sense a force on the bezel and to generate a sensor signal indicative of the force. The handheld device may further include a processor operable to receive the sensor signal and to execute a function based on the sensor signal.

18 Claims, 9 Drawing Sheets

FORCE SENSING BEZEL TOUCH INTERFACE

CROSS REFERENCE TO RELATED APPLICATIONS

This application is a continuation of U.S. patent application Ser. No. 15/744,763, filed Jul. 15, 2016 which is a National Stage Entry of Application No. PCT/US2016/042667 filed Jul. 15, 2016 which claims the benefit of Singapore Application No. 10201505555S filed Jul. 15, 2015; the disclosures of which are incorporated herein by reference in their entireties.

TECHNICAL FIELD

The present disclosure generally relates to a force sensing bezel touch interface. More particularly, aspects of the present disclosure are directed to a bezel touch interface including force sensing elements and haptic feedback elements.

BACKGROUND

There are existing electronic devices or computing devices that utilize force sensing for detection of user input. Some publications disclose applications and/or methods for force sensing detection on bezels of the electronic devices. The applications and/or methods rely on capacitive based sensing devices to detect the presence of input forces applied on the external bezels.

U.S. Pat. No. 7,656,393 discloses an electronic device having a display and a touch sensitive bezel surrounding the display. U.S. Pat. No. 7,778,118 discloses a watch device having a touch sensitive user interface with a sensor positioned within the bezel of the display. United States Patent Publication No. 2010/0265197 discloses a touch screen display having a display, a touch sensitive overlay disposed on the display, and a capacitive force sensor. United States Patent Publication No. 2014/0362001 discloses a method for obtaining information based on touch detection at bezel edges of electronic devices with touch sensing capabilities.

Some problems or limitations associated with the aforementioned disclosures include (i) requiring high-resolution arrangement of force sensing devices; (ii) the touch sensitive bezels are only capable of detecting touch triggers or discrete user inputs on the bezels; and (iii) incompatibility with substantially rigid and electrically conductive bezels.

Therefore, in order to address or alleviate at least one of the aforementioned problems and/or disadvantages, there is a need to provide a force sensing bezel touch interface in which there are at least some improved features over conventional approaches.

DETAILED DESCRIPTION

For purposes of brevity and clarity, descriptions of embodiments of the present disclosure are directed to a force sensing bezel touch interface, in accordance with the drawings in FIG. 1 to FIG. 10. While aspects of the present disclosure will be described in conjunction with the embodiments provided herein, it will be understood that they are not intended to limit the present disclosure to these embodiments. In the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, well-known systems, methods, procedures, and components have not been described in detail as not to unnecessarily obscure aspects of the embodiments of the present disclosure.

A force sensing bezel touch interface is described hereinafter in accordance with representative or example embodiments of the present disclosure.

Figure 1:
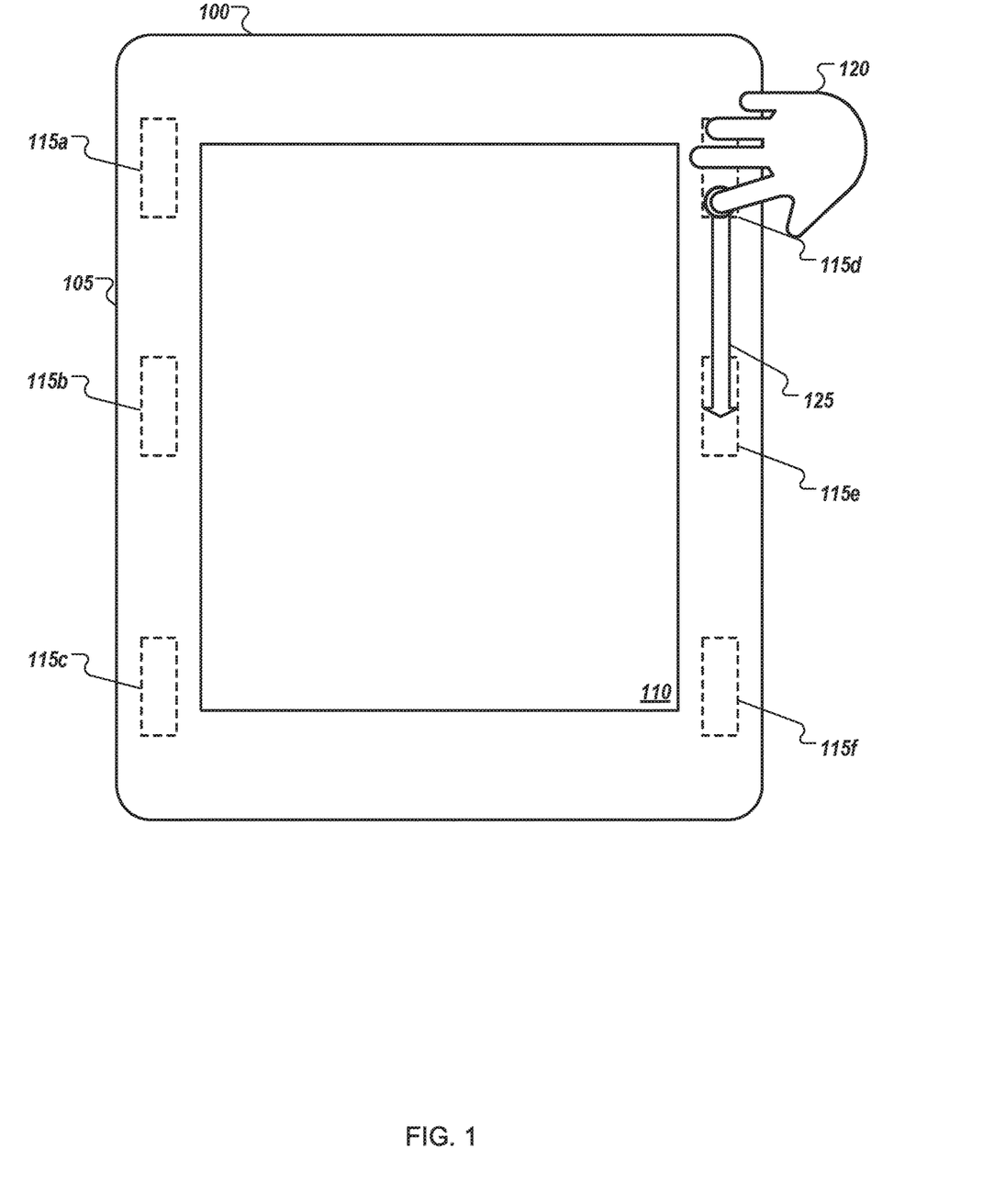
FIG. 1 illustrates a block diagram of an example computer device with a force sensing bezel touch interface arranged in accordance with at least one embodiment described herein.

FIG. 1 illustrates a block diagram of an example computer device 100 with a force sensing bezel touch interface arranged in accordance with at least one embodiment described herein. The computer device 100 may include a processor-based computing system. The computer device 100 may include memory, a processor, and network communication capabilities. Some examples of the computer device 100 may include a mobile phone, a smartphone, a tablet computer, a laptop computer, a desktop computer, a set-top box, a virtual-reality device, or a connected device, etc., or any other device with a bezel 105 and a display 110. The bezel 105 may include a region between an outer perimeter of the computer device 100 and the display 110. The bezel 105 may be constructed from any type of material, such as plastic, metal, composite, etc. The display 110 may be any type of display, such as a backlit display (e.g., Light-emitting diode (LED)), an electroluminescent display (e.g., organic light-emitting diode (OLED)), or any other type of display 110.

The computer device 100 may include one or more force sensing elements 115. The force sensing elements 115 may be configured to detect force or pressure on the bezel 105. The force sensing elements 115 may be integrated within the bezel 105 or may be disposed behind the bezel 105. The force or pressure may include a point force at a singular location. Alternatively, the force or pressure may include a moving force that may move between different locations, such as would be expected with a user gesture (e.g., a slide, swipe). The force sensing element 115 may include a force-sensing resistor. The force-sensing resistor may include a material whose resistance changes when a force or pressure is applied. The force sensing element 115 may also include a piezoelectric force sensor and/or a capacitive force sensor.

As illustrated the computer device 100 includes six force sensing elements 115a, 115b, 115c, 115d, 115e and 115f. The arrangement of the force sensing elements 115a, 115b, 115c, 115d, 115e and 115f on the bezel 105 of the computer device 100 may provide a user additional benefits as compared to a device without the bezel-based force sensing elements. The physical and electronic arrangement of the force sensing elements 115a, 115b, 115c, 115d, 115e and 115f provides detection and measurement of an input force profile related to user touch parameters. These user touch parameters include, but are not limited to, discrete touch points, multi-touch points, and gestures. The dynamic force detection and measurement is compatible with substantially rigid and electrically conductive bezel substrates which may interfere with conventional resistive and capacitive based touch sensing methods. The dynamic force detection and measurement data is computationally processed to provide interactive functional control of the portable computing devices, wherein the functions include, but are not limited to, application switching and document viewing.

In an example, a user may input a force on the bezel 105 using their hand or finger 120. The user may slide their finger 120 in a downward direction 125, which may correspond to a particular function. The function may be based on a type of movement and/or a position of the force. For example, a screen wake function that turns the display 110 on may be in a first position (e.g., near force sensing element 115a). The user may press the bezel 105 near the first position, the force sensing element 115a may detect the force, a processor may cause the display 110 to turn on based on the force detected by the force sensing element 115a. In another example, the user may press the bezel on an upper side portion of the bezel 105 near force sensing elements 115d and 115e (as illustrated). The upper side portion of the bezel 105 may correspond to a volume control function. While maintaining contact with the bezel 105 (or while applying a relatively constant force), the user may slide their finger 120 upward to increase the volume and downward to decrease the volume. Any number of force sensing elements may be used in any position and for any function or combination of functions.

Figure 2:
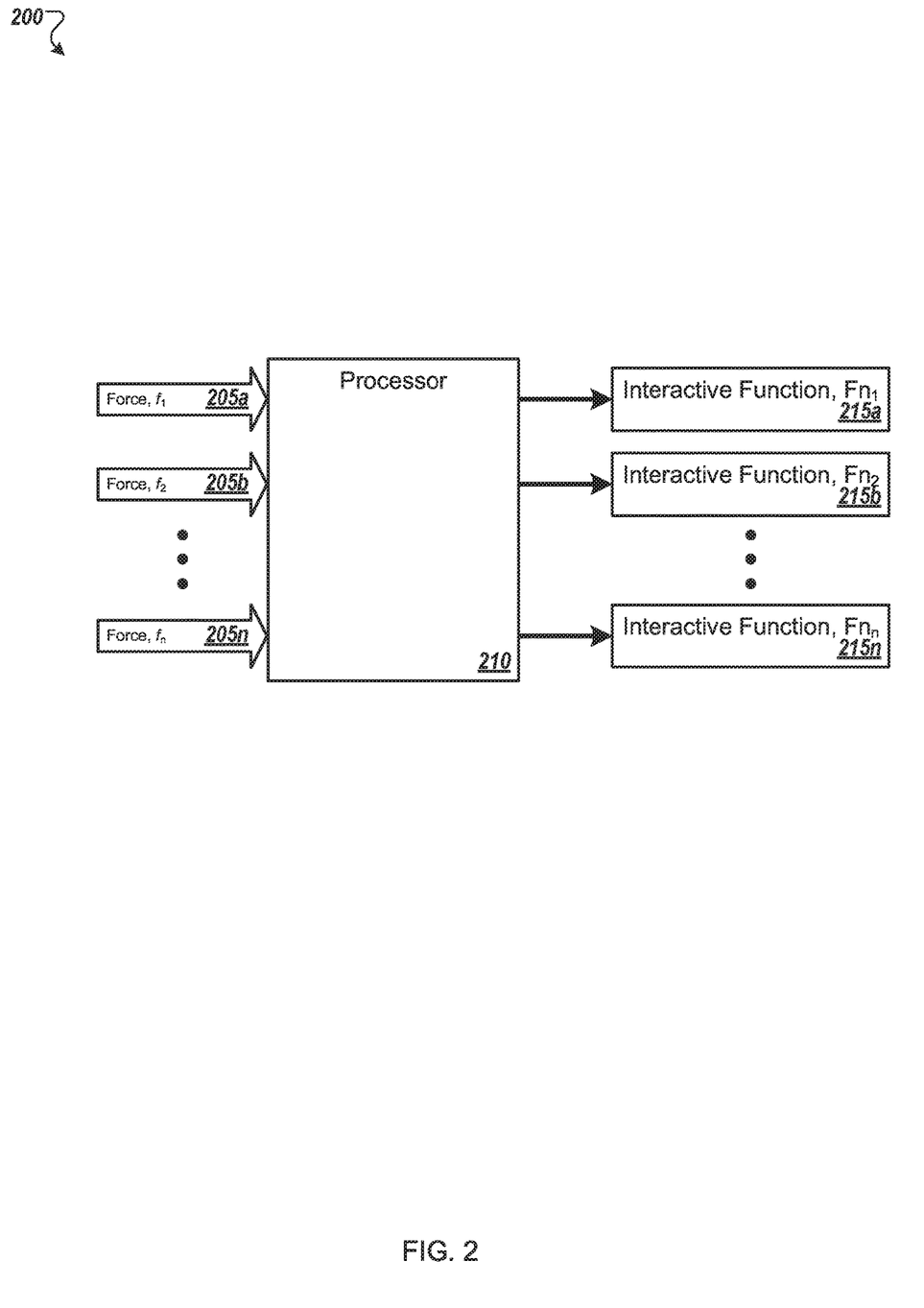
FIG. 2 illustrates an example flow of dynamic force detection and measurement, computational processing of dynamic force detection and measurement, and interactive functional control of a computer device.

FIG. 2 illustrates an example flow 200 of dynamic force detection and measurement, computational processing of dynamic force detection and measurement, and interactive functional control of a computer device. As illustrated any number of forces 205 may be detected, such as by one or more force sensing elements. A processor 210 may receive the forces 205 and determine a function for the forces 205. For example, multiple forces may correspond to a single function. In another example, a first measured force 205a may correspond to a first interactive function 215a. In the implementation flow, the functions include, but are not limited to, application switching, audio/visual controls, display controls, document viewing, or any other function that may be useful with a computer device. Computational processing of dynamic force detection and measurement data from each force sensing element is or can be used to determine discrete touch points, multi-touch points, or gestures.

Figure 3:
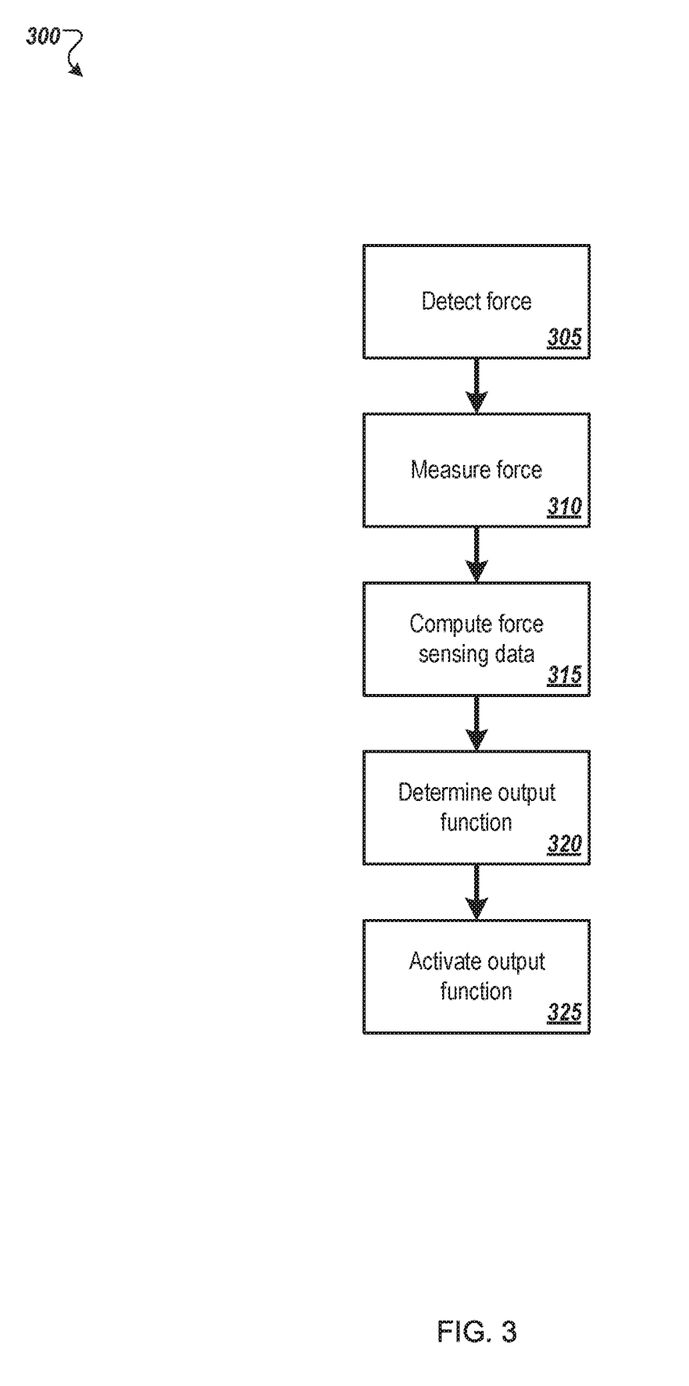
FIG. 3 illustrates a flow diagram of an example method to perform a function based on a force value detected via a bezel.

FIG. 3 illustrates a flow diagram of an example method 300 to perform a function based on a force value detected via a bezel. The method 300 may be performed, at least in part, by processing logic in a computer device, such as the computer device 100 of FIG. 1.

The method 300 may begin at block 305, where the processing logic may detect a force via a bezel (e.g., the bezel 105 of FIG. 1). The force may be detected using a force sensing element, as described herein.

At block 310, the processing logic may measure the force detected at block 305. In some embodiments, the processing logic may detect a magnitude and a direction of the force. The processing logic may also determine a position of the force on the bezel. For example, the processing logic may determine the position of the force on the bezel with respect to a coordinate system.

At block 315, the processing logic may compute force sensing data to determine whether the detected force corresponds to an available function. For example, the processing logic may perform a computation on raw data received from one or more force sensing elements. For example, the processing logic may determine a location, a magnitude and/or a direction for the force based on the raw data. Further, the processing logic may determine a type of user input (e.g., tap, swipe) based on the raw data.

At block 320, the processing logic may analyze the force sensing data and may determine an output function. For example, the detected force may be a swipe from left to right, which may correspond to switching between applications. The processing logic may identify this type of relationship between the detected force and a valid and available function, such as by using at least one of the location of the force, magnitude of the force, direction of the force, or type of user input to lookup an available function.

At block 325, the processing logic may active the output function. For example, when the detected force corresponds to a function to switch between applications, the processing logic may perform the switch between applications.

Figure 4A:
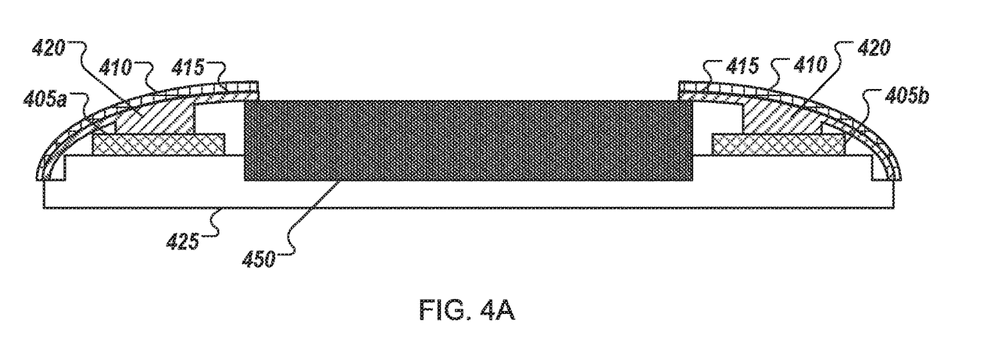
FIG. 4A, FIGS. 4B and 4C illustrate physical stack-up topology of an arrangement of multiple force sensing elements and on a bezel of a computer device.
Figure 4B:
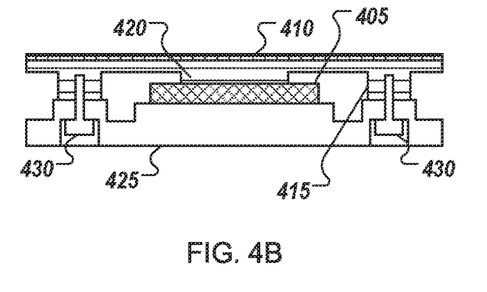
Figure 4C:
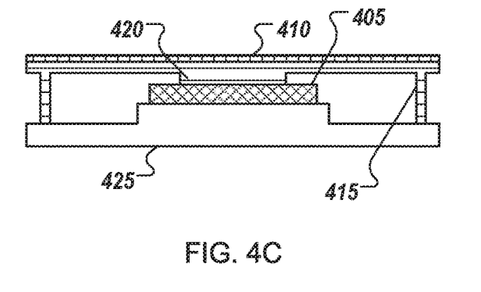

FIG. 4A, FIGS. 4B and 4C illustrate physical stack-up topology 400 of an arrangement of multiple force sensing elements 405a and 405b on a bezel 410 of a computer device. The bezel surface is not limited to co-planarity with adjacent surfaces. Input force applied on an external bezel surface is transmitted to a force sensing element through an interposer 415 which may be mechanically coupled between the bezel surface and force sensing element(s). The bezel 410 may be disposed at least partially above an electronic display 450. The force sensing elements 405a and 405b may be mounted to a housing 425. As illustrated in FIG. 4B, the housing 425 with adjustable mounting screws 430 may be used to provide pre-load force. The mechanical interfacial coupling is substantially rigid and tolerates a wide range of pre-load force range. In a longitudinal direction, the interposer may include a protrusion 420 which may contact one or more force sensing elements. The protrusion 420 may physically improve or enhance vertical transmission of input force applied on the external bezel surface to the respective force sensing elements. The protrusion 420 also may reduce longitudinal transmission of transmission of input force applied on the external bezel surface. The distributed arrangement of the force sensing elements provides spatially selective force sensing. FIG. 4C illustrates a different configuration of the interposer 415.

Figure 5:
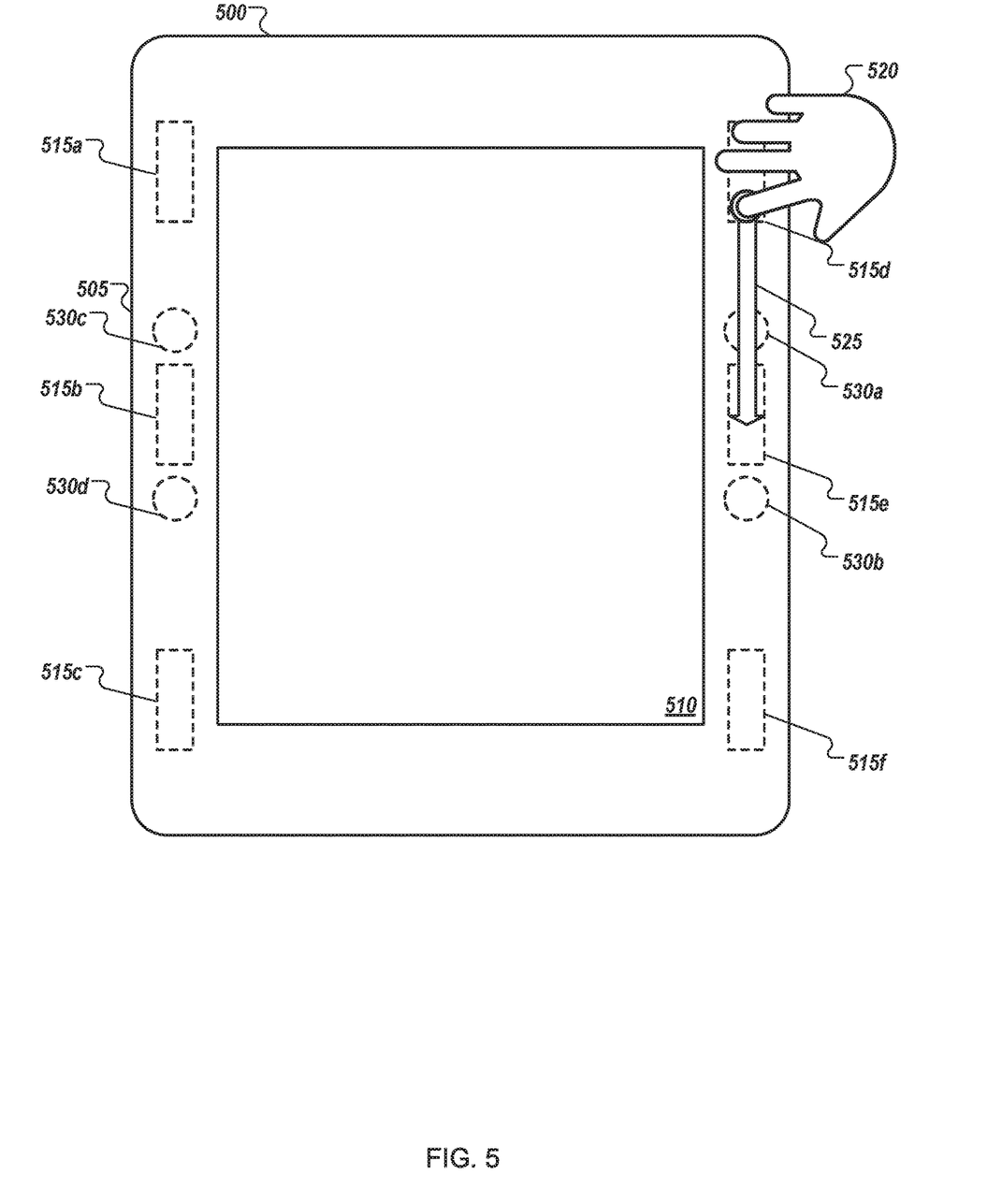
FIG. 5 illustrates a block diagram of an example computer device with a force sensing bezel touch interface.

FIG. 5 illustrates a block diagram of an example computer device 500 with a force sensing bezel touch interface arranged in accordance with at least one embodiment described herein. The computer device 500 may include a processor-based computing system and may be similar to the computer device 100 of FIG. 1. The computer device 500 may include a bezel 505 and a display 510.

The computer device 500 may include one or more force sensing elements 515. The force sensing elements 515 may be configured to detect force or pressure on the bezel 505. The force sensing elements 515 may be integrated within the bezel 505 or may be disposed behind the bezel 505. The force or pressure may include a point force at a singular location. Alternatively, the force or pressure may include a moving force that may move between different locations, such as would be expected with a user gesture (e.g., a slide, swipe). The force sensing element 515 may include a force-sensing resistor. The force-sensing resistor may include a material whose resistance changes when a force or pressure is applied. The force sensing element 515 may also include a piezoelectric force sensor and/or a capacitive force sensor.

As illustrated the computer device 500 includes six force sensing elements 515a, 515b, 515c, 515d, 515e and 515f. The arrangement of the force sensing elements 515a, 515b, 515c, 515d, 515e and 515f on the bezel 505 of the computer device 500 may provide a user additional benefits as compared to a device without the bezel-based force sensing elements. The physical and electronic arrangement of the force sensing elements 515a, 515b, 515c, 515d, 515e and 515f provides detection and measurement of an input force profile related to user touch parameters. These user touch parameters include, but are not limited to, discrete touch points, multi-touch points, and gestures. The dynamic force detection and measurement is compatible with substantially rigid and electrically conductive bezel substrates which may interfere with conventional resistive and capacitive based touch sensing methods. The dynamic force detection and measurement data is computationally processed to provide interactive functional control of the portable computing devices, wherein the functions include, but are not limited to, application switching and document viewing.

The computer device 500 may include one or more haptic feedback elements 530. The haptic feedback elements 530 may be configured to detect force or pressure on the bezel 505. The haptic feedback elements 530 may be integrated within the bezel 505 or may be disposed behind the bezel 505. The haptic feedback elements 530 may produce any type of haptic feedback, such as a vibration, a pulse, a sound, etc.

As illustrated the computer device 500 includes four haptic feedback elements 530a, 530b, 530c, and 530d. The arrangement of the haptic feedback elements 530a, 530b, 530c, and 530d on the bezel 505 of the computer device 500 may provide a user additional benefits as compared to a device without the bezel-based haptic feedback elements. The physical and electronic arrangement of the haptic feedback elements 530a, 530b, 530c, and 530d provides the ability to produce sensory feedback to a user of the computer device 500 at various locations of the bezel 505.

In an example, a user may input a force on the bezel 505 using their hand or finger 520. The user may slide their finger 520 in a downward direction 525, which may correspond to a particular function. The function may be based on a type of movement and/or a position of the force. For example, a screen wake function that turns the display 510 on may be in a first position (e.g., near force sensing element 515a). The user may press the bezel 505 near the first position, the force sensing element 515a may detect the force, a processor may cause the display 510 to turn on based on the force detected by the force sensing element 515a. Further, the haptic feedback element nearest the first position (e.g., the haptic feedback element 530c) may provide a haptic response (e.g., a pulse or vibration), which may indicate to the user that the user activated the function of turning the display 510 on. In another example, the user may press the bezel on an upper side portion of the bezel 505 near force sensing elements 515d and 515e (as illustrated). The upper side portion of the bezel 505 may correspond to a volume control function. While maintaining contact with the bezel 505 (or while applying a relatively constant force), the user may slide their finger 520 upward to increase the volume and downward to decrease the volume. Any number of force sensing elements may be used in any position and for any function or combination of functions. The haptic feedback element nearest the upper side portion of the bezel 505 (e.g., the haptic feedback element 530a) may provide a haptic response (e.g., a pulse or vibration) during some or all of the time in which the user is sliding their finger 520, which may indicate to the user that the user is activating the function of increasing or decreasing the volume.

Figure 6:
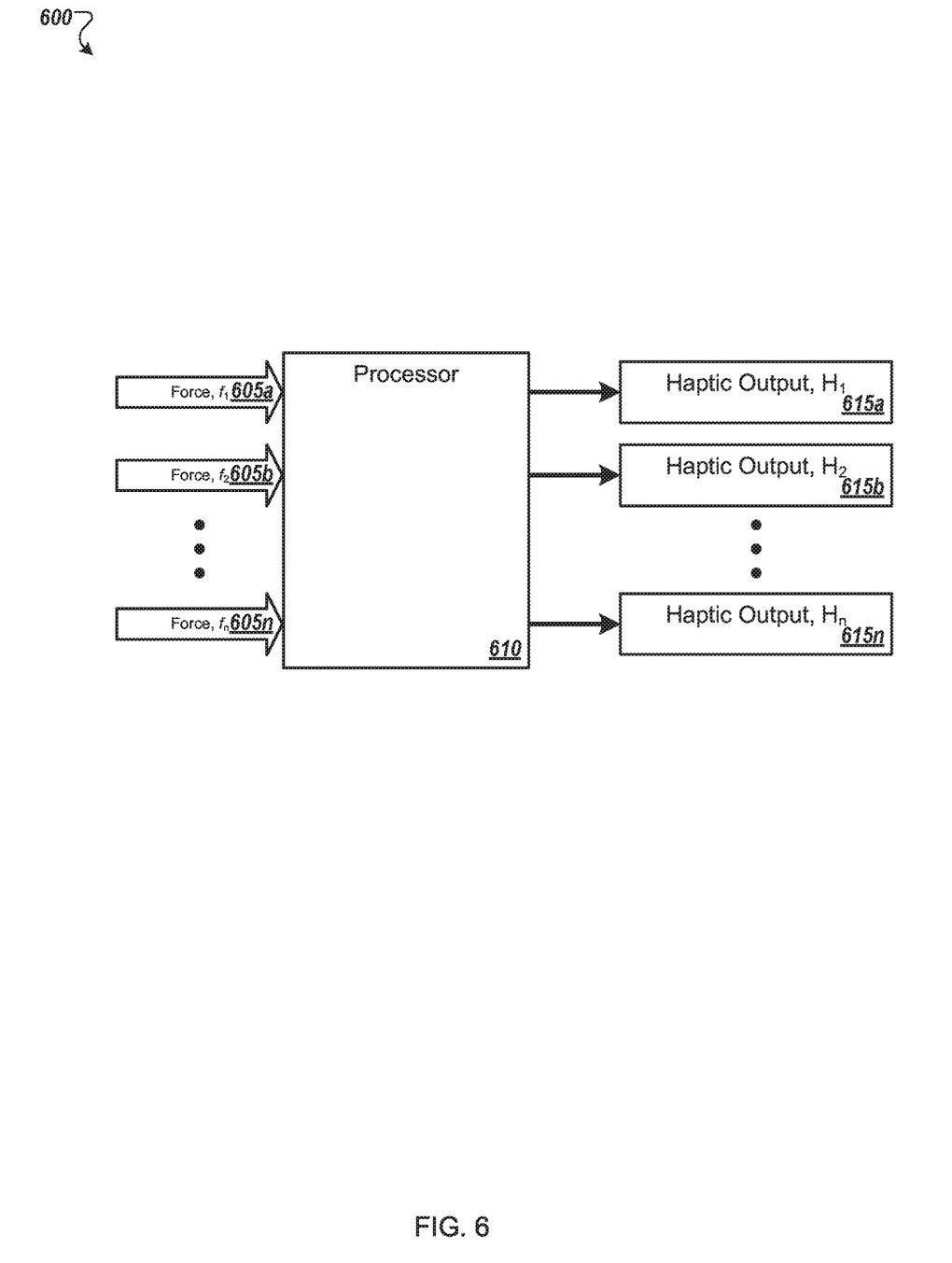
FIG. 6 illustrates an example flow of dynamic force detection and measurement, computational processing of dynamic force detection and measurement, and interactive control of haptic feedback profile for haptic feedback elements of a computer device.

FIG. 6 illustrates an example flow 600 of dynamic force detection and measurement, computational processing of dynamic force detection and measurement, and interactive control of haptic feedback profile for haptic feedback elements of a computer device. As illustrated any number of forces 605 may be detected, such as by one or more force sensing elements. A processor 610 may receive the forces 605 and determine a haptic feedback profile or haptic output for the forces 605. For example, multiple forces may correspond to a haptic output. In another example, a first measured force 605a may correspond to a first interactive function 215a. In the implementation flow, the functions include, but are not limited to, application switching, audio/visual controls, display controls, document viewing, or any other function that may be useful with a computer device. Computational processing of dynamic force detection and measurement data from each force sensing element is or can be used to determine discrete touch points, multi-touch points, or gestures.

Figure 7:
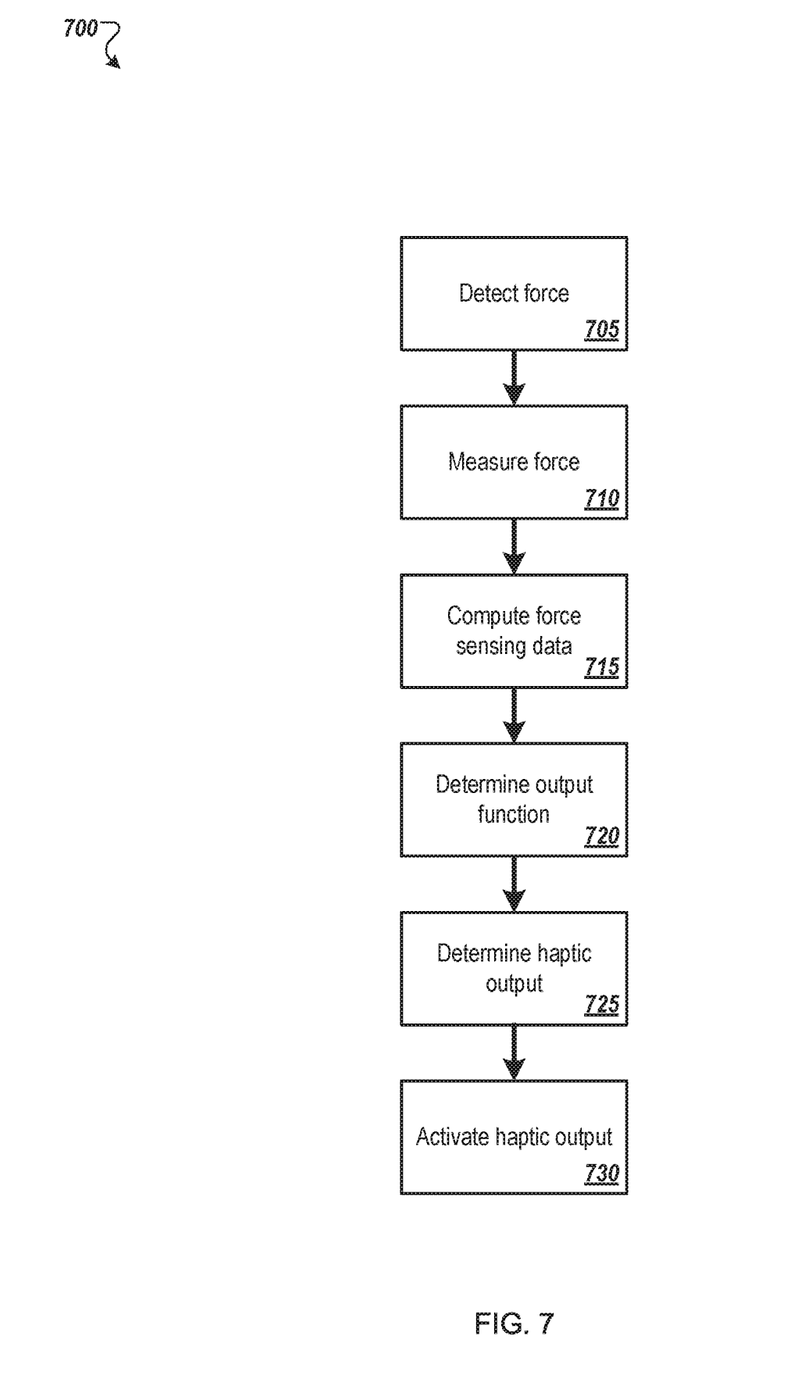
FIG. 7 illustrates a flow diagram of an example method to activate a haptic output based on a force value detected via a bezel.

FIG. 7 illustrates a flow diagram of an example method 700 to activate a haptic output based on a force value detected via a bezel. The method 700 may be performed, at least in part, by processing logic in a computer device, such as the computer device 100 of FIG. 1.

The method 700 may begin at block 705, where the processing logic may detect a force via a bezel (e.g., the bezel 105 of FIG. 1). The force may be detected using a force sensing element, as described herein.

At block 710, the processing logic may measure the force detected at block 705. In some embodiments, the processing logic may detect a magnitude and a direction of the force. The processing logic may also determine a position of the force on the bezel. For example, the processing logic may determine the position of the force on the bezel with respect to a coordinate system.

At block 715, the processing logic may compute force sensing data to determine whether the detected force corresponds to an available haptic output. For example, the processing logic may perform a computation on raw data received from one or more force sensing elements. For example, the processing logic may determine a location, a magnitude and/or a direction for the force based on the raw data. Further, the processing logic may determine a type of user input (e.g., tap, swipe) based on the raw data.

At block 720, the processing logic may analyze the force sensing data and may determine an output function. For example, the detected force may be a swipe from left to right, which may correspond to switching between applications. The processing logic may identify this type of relationship between the detected force and a valid and available function, such as by using at least one of the location of the force, magnitude of the force, direction of the force, or type of user input to lookup an available function.

At block 725, the processing logic may determine a haptic output. For example, the detected force may be a swipe from top to bottom, which may correspond to turning down a volume. The processing logic may identify a relationship between the detected force and a valid and available haptic output, such as by using at least one of the location of the force, magnitude of the force, direction of the force, or type of user input to lookup an available haptic output.

At block 730, the processing logic may active the output function and/or the haptic output. For example, when the detected force corresponds to a function to down the volume, the processing logic may turn down the volume while simultaneously activating the haptic output.

Figure 8A:
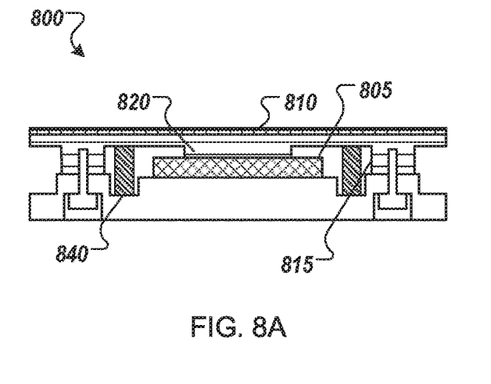
FIG. 8A and FIG. 8B illustrates physical topology of the arrangement of plurality of force sensing elements and haptic feedback elements on a bezel of a portable computing device.
Figure 8B:
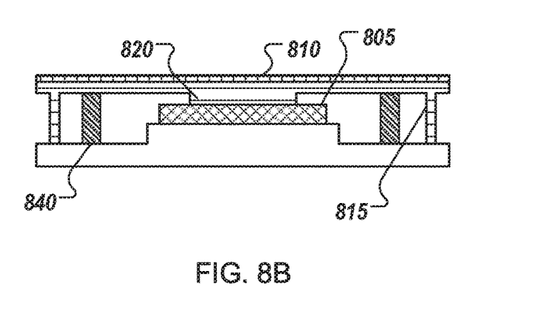

FIG. 8 illustrates a physical stack-up topology 800 of an arrangement of multiple force sensing elements 805 and 805 and one or more haptic feedback elements 840 below a bezel 810 of a computer device. The haptic feedback elements 840 are physically arranged to provide haptic feedback in close physical proximity to the respective force sensing elements 805, while still providing decoupled mechanical path between input force application and haptic feedback.

The bezel surface is not limited to co-planarity with adjacent surfaces. Input force applied on an external bezel surface is transmitted to a force sensing element through an interposer 815 which may be mechanically coupled between the bezel surface and force sensing element(s). A housing 850 (with adjustable mounting screws) may be used to provide pre-load force. The mechanical interfacial coupling is substantially rigid and tolerates a wide range of pre-load force range. In a longitudinal direction, the interposer may include a protrusion 420 which may contact one or more force sensing elements. The protrusion 420 may physically improve or enhance vertical transmission of input force applied on the external bezel surface to the respective force sensing elements. The protrusion 420 also may reduce longitudinal transmission of transmission of input force applied on the external bezel surface. The distributed arrangement of the force sensing elements provides spatially selective force sensing. The one or more haptic feedback elements 840 may be mechanically coupled to an internal surface of the bezel such that haptic output provided by the one or more haptic feedback elements 840 may permeate or transfer through the bezel such they the haptic output may be felt by a user who is in contact with the bezel 810.

Figure 9A:
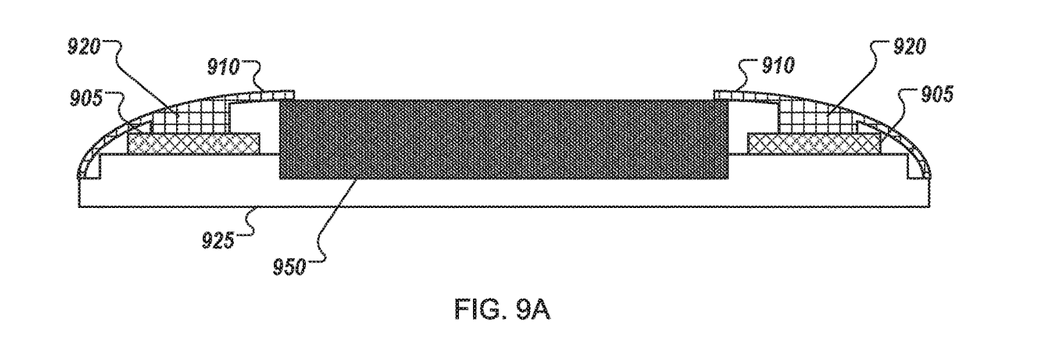
FIG. 9A, FIG. 9B and FIG. 9C illustrate an alternative physical stack-up topology of the arrangement of multiple force sensing elements in mechanical contact with a bezel of a portable computing device.
Figure 9B:
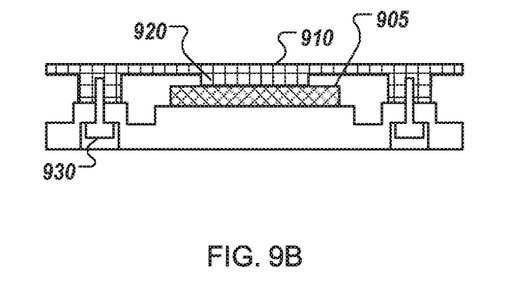
Figure 9C:
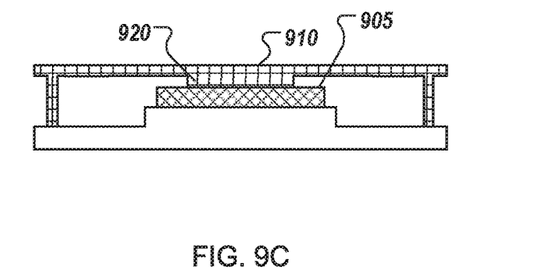

FIG. 9A, FIG. 9B, and FIG. 9C illustrate alternative physical stack-up topologies of the arrangement of multiple force sensing elements 905 in mechanical contact with a bezel 910 of a portable computing device. The bezel 910 may be disposed at least partially above an electronic display 950. The force sensing elements 905 may be mounted to a housing 925. As illustrated in FIG. 9B, the housing 925 with adjustable mounting screws 930 may be used to provide pre-load force. In this arrangement, a separate interposer is not needed. The internal surface of the bezel has protrusions 920 which physically enhance vertical transmission of input force applied on the external bezel surface to the respective force sensing elements. The protrusions 920 also reduce longitudinal transmission of transmission of input force applied on the external bezel surface. The distributed arrangement of the force sensing elements 905 provides spatially selective force sensing.

Figure 10:
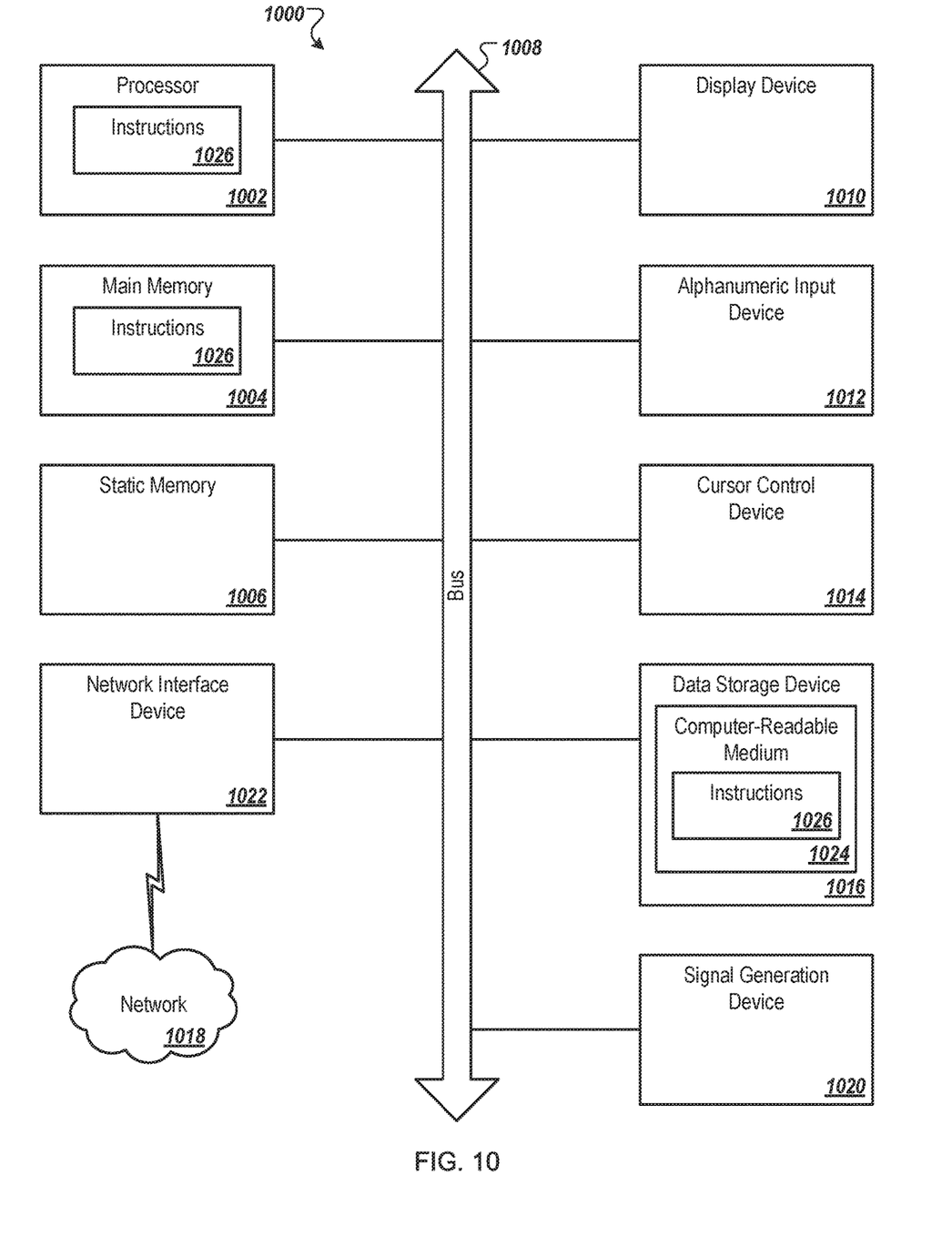
FIG. 10 illustrates a diagrammatic representation of a machine in the example form of a computing device 1000 within which a set of instructions, for causing the machine to perform any one or more of the methods discussed herein, may be executed.

FIG. 10 illustrates a diagrammatic representation of a machine in the example form of a computing device 1000 within which a set of instructions, for causing the machine to perform any one or more of the methods discussed herein, may be executed. The computing device 1000 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 1000 includes a processing device (e.g., a processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)) and a data storage device 1016, which communicate with each other via a bus 1008.

Processing device 1002 represents one or more general-purpose processing devices such as a microprocessor, central processing unit, or the like. More particularly, the processing device 1002 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also include one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein.

The computing device 1000 may further include a network interface device 1022 which may communicate with a network 1018. The computing device 1000 also may include a display device 1010 (e.g., a liquid crystal display (LCD) or a cathode ray tube (CRT)), an alphanumeric input device 1012 (e.g., a keyboard), a cursor control device 1014 (e.g., a mouse) and a signal generation device 1020 (e.g., a speaker). In one implementation, the display device 1010, the alphanumeric input device 1012, and the cursor control device 1014 may be combined into a single component or device (e.g., an LCD touch screen).

The data storage device 1016 may include a computer-readable storage medium 1024 on which is stored one or more sets of instructions 1026 embodying any one or more of the methods or functions described herein. The instructions 1026 may also reside, completely or at least partially, within the main memory 1004 and/or within the processing device 1002 during execution thereof by the computing device 1000, the main memory 1004 and the processing device 1002 also constituting computer-readable media. The instructions may further be transmitted or received over a network 1018 via the network interface device 1022.

While the computer-readable storage medium 1026 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

In one aspect, a handheld device includes an electronic display having an active area for presenting visual content. The device further includes a bezel disposed around the electronic display, the bezel having an opening allowing a person to view the active area. The device further includes a force sensing system having a first force sensing element that is disposed below an external surface of the bezel, the force sensing system being configured to a sense a first force on the bezel and to generate a sensor signal indicative of the first force. The device further includes a processor operable to receive the sensor signal and to execute a function based on the sensor signal.

Implementations can include any, all, or none of the following features. The electronic display can include an external surface that can be substantially planar. The bezel can include at least one curved surface. The bezel is disposed around at least two sides of the electronic display. The first force sensing element can be disposed on a first side of the electronic display, the handheld device can include a second force sensing element disposed on a second side of the electronic display. The first side and the second side can be on opposite sides of the electronic display. The first force sensing element can be configured to sense the first force input. The second force sensing element can be configured to sense a second force input. The sensor signal can be generated based on the first force input and the second force input. The first force can be intentionally or unintentionally produced from a user input. The user input can include touching the bezel. The force sensing system can be configured to detect a first location of the first force on the bezel. The sensor signal can be indicative of the first force and the first location. The force sensing system can be configured to detect a third force at a second location on the bezel. The force sensing system can be configured to generate a second sensor signal indicative of the third force. A second function corresponds to the third force and the second location. The handheld device can include a haptic output system having a first haptic element that can be disposed below the external surface of the bezel, the haptic output system being configured to generate a haptic output. The processor can be further operable to drive the first haptic element to generate the haptic output based on the function. The haptic output can include at least one of a vibration or a pulse. The handheld device can include an interposer disposed between an internal surface of the bezel and the first force sensing element, the interposer being configured to mechanically transfer force between the bezel and the first force sensing element. A first surface of the interposer can include at least one curve to correspond with at least one curve in the bezel. The interposer can include a protrusion being configured to contact the first force sensing element. The handheld device can include a housing being disposed opposite of the active area of the electronic display.

In one aspect, a handheld device includes an electronic display having an active area for presenting visual content. The device further includes a bezel disposed around the electronic display, the bezel having an opening allowing a person to view the active area. The device further includes a force sensing system having a force sensing element that is disposed below an external surface of the bezel, the force sensing system being configured to a sense a force on the bezel and to generate a sensor signal indicative of the force. The device further includes a haptic output system having a haptic element that is disposed below the external surface of the bezel, the haptic output system being configured to generate a haptic output. The device further includes a processor operable to receive the sensor signal, to execute a function based on the sensor signal, and to drive the haptic element to generate the haptic output based on the function.

Implementations can include any, all, or none of the following features. The electronic display can include an external surface that can be substantially planar. The bezel can include at least one curved surface. The bezel is disposed around at least two sides of the electronic display. The force sensing element can be disposed on a first side of the electronic display, the handheld device can include a second force sensing element disposed on a second side of the electronic display. The first side and the second side can be on opposite sides of the electronic display. The second force sensing element can be configured to sense a second force. The sensor signal can be additionally generated based on the second force.

In one aspect, a method includes detecting, by a force sensing element, a force on a bezel that surrounds an electronic display of a handheld device. The method further includes computing force sensing data to determine a user input type based on the force. The user input type includes at least one of a touch or a swipe on the bezel. The method further includes determining output function based on the user input type. The output function pertains to a computer-based function. The method further includes activating the output function via the electronic display.

Implementations can include any, all, or none of the following features. The method can include providing a haptic output that corresponds to the function via the bezel.

According to an aspect of the present disclosure, there is a bezel touch interface comprising of force sensing elements and haptic feedback elements. The force sensing elements and haptic feedback elements are physically and electronically arranged to achieve intuitive user experience in human-machine interface applications. The physical and electronic arrangement of force sensing elements provides detection and measurement of input force profile related to user touch parameters. These user touch parameters include, but are not limited to, discrete touch points, multi-touch points, and gestures. The dynamic force detection and measurement is compatible with substantially rigid and electrically conductive bezel substrates which interfere with conventional resistive and capacitive based touch sensing methods. The dynamic force detection and measurement data is computationally processed to provide interactive control of haptic feedback profile and interactive functional control of electronic devices.

In embodiments of the present disclosure, there is an interactive bezel interface with force sensing function comprising: contiguous bezel for external input force application; contiguous interposer with protrusions for physical transmission of input force; plurality of force sensing elements coupled to the interposer; and housing coupled to the force sensing elements.

In embodiments of the present disclosure, there is an interactive bezel interface with force sensing and haptic feedback functions comprising: contiguous bezel for external input force application; contiguous interposer with protrusions for physical transmission of input force; plurality of force sensing elements coupled to the interposer; plurality of haptic feedback elements coupled to the interposer; and housing coupled to the force sensing elements In embodiments of the present disclosure, there is an interactive bezel interface with force sensing function comprising: contiguous bezel with protrusions for external input force application; contiguous plurality of force sensing elements coupled to the bezel; and housing coupled to the force sensing elements.

In embodiments of the present disclosure, there is an interactive bezel interface with force sensing and haptic feedback functions comprising: contiguous bezel with protrusions for external input force application; plurality of force sensing elements coupled to the bezel; plurality of haptic feedback elements coupled to the bezel; and housing coupled to the force sensing elements and haptic feedback elements In embodiments of the present disclosure, there is an interactive human-machine interface comprising contiguous bezel with protrusions for external input force application; plurality of force sensing elements coupled to the bezel; plurality of haptic feedback elements coupled to the bezel; and housing coupled to the force sensing elements and haptic feedback elements.

In embodiments of the present disclosure, there is an interactive human-machine interface comprising dynamic force detection and measurement; computational processing of dynamic force detection and measurement; detection and measurement of input force profile related to user touch parameters; and interactive functional control of electronic devices.

In embodiments of the present disclosure, there is an interactive human-machine interface comprising dynamic force detection and measurement; computational processing of dynamic force detection and measurement; detection and measurement of input force profile related to user touch parameters; interactive functional control of electronic devices; and interactive control of haptic feedback profile.

An advantage of the present disclosure is that the bezel interface uses a plurality of force sensing elements which provide for dynamic force detection and measurement. Another advantage is that the computational processing of the dynamic force detection and measurement data from each force sensing element can be used to determine discrete touch points, multi-touch points, and/or gestures.

A force sensing touch bezel interface according to various embodiments of the present disclosure is thus disclosed hereinabove. Various features, aspects, and advantages of the present disclosure will become more apparent from the following detailed description of the embodiments of the present disclosure, by way of non-limiting examples only, along with the accompanying drawings in which like numerals represent like components.

The force sensing elements described hereinabove include force sensing materials for detecting force or pressure displacements caused by user inputs thereon. As readily understood by the skilled person, force is associated with pressure and area. Thus, it would be apparent to the skilled person that the force sensing elements and other force-related components may also be interpreted as being pressure sensitive or pressure sensing. The force sensing elements are configured for detecting force and/or pressure from the user inputs, as compared to conventional sensors that utilize resistive and/or capacitive techniques. Conventional resistive and/or capacitive techniques are not capable of dynamic force detection and measurement. Various firmware and/or software algorithms may be implemented, as known to the skilled person, for converting the user inputs on the force sensing materials to input signals for the electronic or computing device.

In several embodiments of the present disclosure, the force sensing touch bezel interface may be implemented or integrated in various products or in existing products. An example of an application of the bezel interface is for providing human-machine interface control in computing devices. These computing devices include, but are not limited to, portable electronic devices and/or automotive consoles. Other examples or applications of the bezel interface are in the form wearable devices that can be worn or conveniently carried by users.

In the foregoing detailed description, embodiments of the present disclosure in relation to a force sensing bezel touch interface are described with reference to the provided figures. The description of the various embodiments herein is not intended to call out or be limited only to specific or particular representations of the present disclosure, but merely to illustrate non-limiting examples of the present disclosure.

The present disclosure serves to address at least some of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure.

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. The recitation of a particular numerical value or value range herein is understood to include or be a recitation of an approximate numerical value or value range, for instance, within +/−20%, +/−15%, +/−10%, +/−5%, or +/−0%. With respect to recitations herein directed to dimensional or numerical comparisons or equivalence, reference to the terms "generally," "approximately," or "substantially" is understood as falling within +/−20%, +/−15%, +/−10%, +/−5%, or +/−0% of a representative/example comparison, or a specified or target value or value range; and reference to the term "essentially"

is understood as falling within +/−10%, +/−5%, +/−2%, +/−1%, or +/−0% of a representative/example comparison, or a specified or target value or value range.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in An Introduction to Mathematical Reasoning: Numbers, Sets, and Functions, "Chapter 11: Properties of Finite Sets" (e.g., as indicated on p. 140), by Peter J. Eccles, Cambridge University Press (1998)). In general, an element of a set can include or be a system, an apparatus, a device, a structure, an object, a process, a physical parameter, or a value depending upon the type of set under consideration.

The invention claimed is:

1. A device, comprising:
a bezel having an outer region and an inner region, the outer region being constructed from a material, the inner region being devoid of the material, wherein when the bezel is attached to a handheld device, the inner region permitting an electronic display of the handheld to be visible;
a force sensing system having a first force sensing element that is disposed below an external surface of the bezel, the force sensing system being configured to a sense first force on the bezel and to generate a sensor signal indicative of the first force; and
an interposer disposed between an internal surface of the bezel and the first force sensing element, the interposer being configured to mechanically transfer force between the bezel and the first force sensing element.

2. The device of claim 1, wherein a first surface of the interposer includes at least one curve to correspond with at least one curve in the bezel.

3. The device of claim 1, wherein the interposer includes a protrusion being configured to contact the first force sensing element.

4. The device of claim 1, wherein the first force sensing element is disposed on a first side of the electronic display, the handheld device comprising a second force sensing element disposed on a second side of the electronic display, wherein the first side and the second side are on opposite sides of the electronic display.

5. The device of claim 4, wherein the first force sensing element is configured to sense the first force, wherein the second force sensing element is configured to sense a second force, wherein the sensor signal is generated based on the first force and the second force.

6. The device of claim 1, wherein the first force is produced from a user input, wherein the user input includes touching the bezel.

7. The device of claim 1, wherein the force sensing system is configured to detect a first location of the first force on the bezel, wherein the sensor signal is indicative of the first force and the first location.

8. The device of claim 7, wherein the force sensing system is configured to detect a third force at a second location on the bezel, wherein the force sensing system is configured to generate a second sensor signal indicative of the third force, wherein a second function corresponds to the third force and the second location.

9. The device of claim 1 further comprising a haptic output system having a first haptic element that is disposed below the external surface of the bezel, the haptic output system being configured to generate a haptic output, wherein the processor is further operable to drive the first haptic element to generate the haptic output based on the function.

10. The device of claim 9, wherein the haptic output comprises at least one of a vibration or a pulse.

11. A device, comprising:
a bezel having an opening allowing a view of an active area of an electronic display;
a force sensing system having a first force sensing element that is coupled to the bezel,
the force sensing system being configured to sense a first force on the bezel,
the force sensing system having a second force sensing element that is coupled to the bezel, and
the force sensing system to generate a sensor signal indicative of both of the first force and a second force, wherein the first force and the second force are indicative of a gesture on the bezel; and
an interposer disposed between an internal surface of the bezel and the first force sensing element, the interposer being configured to mechanically transfer force between the bezel and the first force sensing element.

12. The device of claim 11, wherein the gesture on the bezel includes a swipe.

13. The device of claim 11, wherein a first surface of the interposer includes at least one curve to correspond with at least one curve of the bezel.

14. The device of claim 11, wherein the interposer includes a protrusion being configured to contact the first force sensing element.

15. The device of claim 11, further comprising a haptic output system having a haptic element that is coupled to the bezel, the haptic output system being configured to generate a haptic output responsive to one or more of the first force and the second force.

16. The device of claim 11, wherein a detection of the first force before a detection of the second force is indicative of a gesture on the bezel in a first direction.

17. The device of claim 16, wherein the detection of the first force after the detection of the second force is indicative of the gesture on the bezel in a second direction.

18. The device of claim 16, wherein the first direction of the gesture corresponds to a first function, wherein the second direction of the gesture corresponds to a second function.

* * * * *